(12) United States Patent
Park et al.

(10) Patent No.: US 8,978,269 B2
(45) Date of Patent: Mar. 17, 2015

(54) HYBRID DRYING SYSTEM AND METHOD FOR CONTROLLING A HYBRID DRYING SYSTEM

(75) Inventors: Seung Tae Park, Seongnam-si (KR); Hue Jae Kim, Uiwang-si (KR); Hyun Woong Choi, Seoul (KR); Kyung Rok Yoo, Suwon-si (KR); Dong Hyuk Kim, Seongnam-si (KR)

(73) Assignee: Air-Tech Engineering Co., Ltd., Seongnam-si, Gyeonggi-do (KR)

( * ) Notice: Subject to any disclaimer, the term of this patent is extended or adjusted under 35 U.S.C. 154(b) by 878 days.

(21) Appl. No.: 13/142,817

(22) PCT Filed: May 19, 2010

(86) PCT No.: PCT/KR2010/003147
§ 371 (c)(1),
(2), (4) Date: Jun. 29, 2011

(87) PCT Pub. No.: WO2011/004959
PCT Pub. Date: Jan. 13, 2011

(65) Prior Publication Data
US 2011/0271548 A1  Nov. 10, 2011

(30) Foreign Application Priority Data
Jul. 8, 2009  (KR) ......................... 10-2009-0062244

(51) Int. Cl.
*F26B 3/00* (2006.01)
*F26B 21/08* (2006.01)
(Continued)

(52) U.S. Cl.
CPC ............... *F26B 21/08* (2013.01); *F26B 21/086* (2013.01); *F26B 21/06* (2013.01); *F24F 3/14* (2013.01); *F24F 2203/1016* (2013.01); *F24F 2203/1032* (2013.01)
USPC ................... 34/475; 34/467; 34/474; 34/476; 34/477

(58) Field of Classification Search
CPC ............................... F26B 21/06; F26B 21/086
USPC ............................................. 34/467, 474–477
See application file for complete search history.

(56) References Cited

U.S. PATENT DOCUMENTS 2,611,172 A * 9/1952 Bolinger et al. ................. 28/180
3,833,205 A * 9/1974 McAnespie ................... 261/133
(Continued)

FOREIGN PATENT DOCUMENTS

JP      20070017107 A   1/2007
KR   1020050047850 A   5/2005
(Continued)

OTHER PUBLICATIONS

International Search Report of International Application No. PCT/KR2010/003147, dated Dec. 30, 2010.

*Primary Examiner* — Kenneth Rinehart
*Assistant Examiner* — Gajanan M Prabhu
(74) *Attorney, Agent, or Firm* — Novick, Kim & Lee, PLLC; Jae Youn Kim

(57) ABSTRACT

Disclosed is a hybrid drying system where a cold-air drier and a desiccant drier are combined to increase drying efficiency (extent of dehumidification/power consumption), thereby shortening drying time and significantly reducing operation costs. The hybrid drying system includes a desiccant drier installed between an evaporator and a condenser and having an absorbing part configured to produce dry air from the cold-air dried air which has passed through the evaporator and a detaching part configured to supply recycled air heated by the condensation heat of the condenser as a recycling heat source; a heat exchanger configured to heat-exchange exterior air with recycled exhaust air with the recycled air to retrieve exhaust heat; and a control unit configured to simultaneously control a cold-air drying operation and a desiccant drying operation according to the humidity and temperature of the drying chamber. The hybrid drying system is operated through a freezing cycle, a drying cycle, a drying chamber circulating cycle, and a recycling cycle.

1 Claim, 6 Drawing Sheets

(51) Int. Cl.
*F24F 3/14* (2006.01)
*F26B 21/06* (2006.01)

(56) References Cited

U.S. PATENT DOCUMENTS 5,666,739 A * 9/1997 Krueger ............................. 34/86
7,260,945 B2 * 8/2007 Landry ............................. 62/94
7,691,132 B2 * 4/2010 Landry et al. .................. 606/279
7,694,432 B2 * 4/2010 Eriksson et al. ................. 34/266
2003/0233941 A1 12/2003 Battershell et al.

FOREIGN PATENT DOCUMENTS

KR 100614280 B1 8/2006
KR 1020070115906 A 12/2007

* cited by examiner

HYBRID DRYING SYSTEM AND METHOD FOR CONTROLLING A HYBRID DRYING SYSTEM

TECHNICAL FIELD

The present invention relates to a hybrid drying system where condensation heat of a condenser obtained during a cold-air drying operation is used in a desiccant drying method, and a method of controlling the same. More particularly, the present invention relates to a hybrid drying system where a cold-air dryer and a desiccant dryer are combined in a hybrid manner to significantly reduce operation costs while increasing drying efficiency (extent of dehumidification/power consumption) by more than 2 times as that of a conventional cold-air dryer and by more than 1.5 times as that of a complex dryer (a combination of a cold-air dryer and a desiccant dryer which are simultaneously operated individually) and shortening drying time at the same time, and a method of controlling the same.

That is, the present invention has been suggested from the fact that it is efficient to simultaneously operate a cold-air dryer and a desiccant dryer when they are basically provided individually while a cold-air drying operation is advantageous in a constant rate drying section and a desiccant drying operation is advantageous in a falling rate drying section. Thus, the present invention relates to a hybrid drying system which can be applied to various drying systems such as a box type drying system, a rotary drying system, an automatically fed drying system and where a cold-air dryer and a desiccant dryer are combined in a simple structure and the desiccant dryer uses condensation heat of a condenser of the cold-air dryer without using a separate recycled heat source as in an existing product, and a method of controlling the same.

Also, the present invention relates to a cold-air drying/desiccant drying combined hybrid drying system which is particularly suitable for optimally drying an article at a normal temperature to be applied to all drying fields and increases extent of drying by simultaneously performing a cold-air drying operation and a desiccant drying operation to maintain the air within a drying chamber at a proper temperature and a proper humidity, thereby significantly shortening drying time, enhancing drying efficiency, remarkably reducing operation costs, and improving the quality of a dried article, and a method of controlling the same.

BACKGROUND ART

In general, existing drying methods include a hot-air drying method, a cold-air drying method, and a freeze vacuum drying method, and a drying method is selected according to the type of articles to be dried, considering economy and experiences.

In spite that the cold-air drying method ensures the taste, odor, quality, and function of a food, its uses are restricted by high costs, and technical investment and researches for the cold-air drying method have not been sufficient due to the small size of the cold-air drying market, hampering development of the technology. The cold-air drying technology has developed with its specialty, but the desiccant drying technology is nearly an exploitation field and its importance has not been recognized. Thus, combination of the two technologies is a big change and is expected to be required in the market.

The drying characteristics of articles include constant rate drying and falling rate drying. In an existing arranged cold-air dryer, since the cooling heat of the cold-air dryer is used to remove the moisture load and the heating load used to vaporize moisture in dried articles is removed by the condensation heat of a condenser in the constant rate drying section, the difference in the absolute humidity of an inlet and an outlet of the evaporator, enhancing efficiency. However, in the falling rate drying section, since the cooling load is large as compared with the cooling heat of the cold-air dryer and the difference in absolute humidity is small as time lapses, the drying time becomes longer, making it difficult to efficiently use energy. Thus, it is impossible to operate the dryer below a predetermined humidity.

The constant rate drying state is nearly a state where moisture is vaporized from a water surface. That is, the drying speed is constant at the beginning stage of the drying operation.

If the constant rate drying operation is completed, the drying speed and (the amount of vaporized moisture*the percentage of water content) are linearly (proportional) reduced in the falling rate drying operation. It is called a first falling rate drying stage.

Next, the drying speed, the percentage of water content, and the amount of vaporized moisture are changed in a curved manner. It is called a second falling rate drying stage.

Meanwhile, Korean Patent No. 10-0614280 discloses "a low dew point cooling/dehumidifying system and a cooling/dehumidifying method".

The patent relates to a low dew point cooling/dehumidifying apparatus which includes a compressor, a condenser, an expansion valve, an evaporator, and a blower to allow air to pass through the evaporator, and includes a refrigerant liquid valve installed on a freezing cycle, a pressure detector installed around the evaporator, a reheating coil connected to an exterior air condenser in parallel to pass the drying chamber air which has passed through the evaporator, a hot gas valve installed at an inlet side of the reheating coil, a condenser valve installed at an inlet side of the condenser, a low pressure switch installed between the compressor and the evaporator, and an evaporator temperature sensor connected to the evaporator, wherein the air which has passed through the evaporator passes by the reheating coil.

However, the patent has the following disadvantages.

That is, the cold-air drying operation at a dew point of below 5 degrees Celsius is almost impossible due to stacked frost, and since the dehumidifying load becomes larger than the cooling load to maintain a low humidity in the cold-air drying operation even when the stacked frost heat is used at a low temperature operation, the dehumidifying efficiency of a freezer becomes lower, considering the drying load, and the operation costs increase.

Although the cold-air drying method is advantageous as the condensation heat of the condenser can be utilized by 100% during the constant rate drying operation, the falling rate drying operation of dried articles becomes dull. In addition, since the actual amount of dried moisture significantly lowers as compared with the cooling efficiency, operation costs increase as the drying time of the dried articles becomes longer.

DISCLOSURE

Technical Problem

The present invention has been made to solve the problems occurring in the prior art, and an object of the present invention is to provide a hybrid drying system which circulates air only through ventilation of a drying chamber, combines a cold-air drying operation and a desiccant drying operation to simultaneously perform the cold-air operation and the desiccant drying operation to dried articles in the drying chamber, uses condensation heat of a condenser as a recycling heat source during the cold-air drying operation to supply the condensation heat to a desiccant drier, thereby operating the desiccant drier without supplying any separate heat source and making it possible to reduce operation costs and energy by shortening drying time, and maximizes the value of products by naturally drying the products, and a method of controlling the same.

Technical Solution

In order to accomplish the above objects, according to one embodiment of the present invention, there is provided a hybrid drying system applied to a box type system, a rotary system, and an automatic feed system for drying dried articles at a normal temperature, the hybrid drying system comprising: a drying chamber within which dried articles are accommodated; a compressor configured to compress a refrigerant transferred thereto from an evaporator; a condenser configured to receive and condense the refrigerant compressed by the compressor; an expansion valve configured to expand the refrigerant which has passed through the condenser; an evaporator configured to heat-exchange the refrigerant which has passed through the expansion valve and retrieved ventilating air to perform a cold-air drying operation; a desiccant drier installed between the evaporator and the condenser and having an absorbing part configured to produce dry air from the cold-air dried air which has passed through the evaporator and a desorbing part configured to supply recycled air heated by the condensation heat of the condenser as a recycling heat source; a heat exchanger configured to heat-exchange exterior air with recycled exhaust air with the recycled air to retrieve exhaust heat; and a control unit configured to simultaneously control a cold-air drying operation and a desiccant drying operation according to the humidity and temperature of the drying chamber, wherein the hybrid drying system is operated through a freezing cycle, a drying cycle, a drying chamber circulating cycle, and a recycling cycle.

According to the exemplary embodiment of the present invention, the hybrid drying system further comprises: a circulation fan configured to circulate the air within the drying chamber; and a sunlight illuminating lamp provided within the drying chamber to expedite a drying operation and improve the physical and chemical characteristics of dried articles under a natural drying condition.

According to the exemplary embodiment of the present invention, the hybrid drying system further comprises a bypass damper provided on the recycled exhaust side so that a temperature of an exterior air inlet rises above zero when an exterior temperature is low.

According to the exemplary embodiment of the present invention, the freezing cycle includes a compressor configured to compress a refrigerant gas transferred thereto from the evaporator, a condenser configured to receive a refrigerant compressed by the compressor and heat-exchange the refrigerant gas of a high temperature and a high pressure with recycled air to produce a high pressure refrigerant liquid from a high pressure refrigerant gas, an expansion valve configured to produce a low pressure refrigerant liquid from the high pressure refrigerant liquid which has passed the condenser, and an evaporator configured to heat-exchange the low pressure refrigerant liquid which has passed through the expansion valve with the drying chamber air transferred thereto from the drying chamber to perform a cold-air drying operation. The drying cycle includes an evaporator configured to heat-exchange the refrigerant liquid which has passed through the expansion valve with the drying chamber air suctioned from the drying chamber to perform a cold-air drying operation, an absorbing part configured to produce dry air from the cold-air dried air which has passed through the evaporator in the desiccant drier, an air supply fan configured to blow the dry air produced in the desiccant drier into the drying chamber, and an air supply line configured to supply the dry air blown by the air supply fan into the drying chamber DM. In the drying chamber circulating cycle, a circulation fan is operated to mix the drying chamber air and the blown dry air and circulate the mixed air to dry the dried articles within the drying chamber, a cold-air drying operation and a desiccant drying operation are controlled to be performed by a control unit according to the temperature and humidity of the drying chamber. The recycling cycle includes a heat exchanger configured to introduce the exterior air as a recycled air via an air filter and heat-exchange the recycled air with the recycled exhaust air to retrieve recycled exhaust heat, a condenser configured to heat-exchange the recycled air which has passed through the heat exchanger with the condensation heat of the condenser to heat the recycled air, a desorbing part configured to recycle the desiccant drier using the recycled air heated by the condensation heat of the condenser, a recycling fan configured to blow the recycled air which has passed through the desiccant drier toward the exhaust side, a heat exchanger configured to heat-exchange the recycled exhaust air blown by the recycling fan to retrieve heat into the recycled air, and an outlet configured to discharge the exhaust air which has passed through the heat exchanger with the recycled exhaust air. When the interior of the drying chamber DM is used as a refrigerating compartment, the freezing cycle and the recycling cycle of the four cycles in the hybrid drying system are performed and the drying cycle is stopped, and the drying chamber circulating cycle may be controlled through an air amount regulating operation.

According to another embodiment of the present invention, there is provided a method of controlling a hybrid drying system applied to a box type system, a rotary system, and an automatic feed system for drying dried articles at a normal temperature, the hybrid drying system comprising a drying chamber within which dried articles are accommodated, a compressor configured to compress a refrigerant transferred thereto from an evaporator, a condenser configured to receive and condense the refrigerant compressed by the compressor, an expansion valve configured to expand the refrigerant which has passed through the condenser, an evaporator configured to heat-exchange the refrigerant which has passed through the expansion valve and retrieved ventilating air to perform a cold-air drying operation, a desiccant drier installed between the evaporator and the condenser and having an absorbing part configured to produce dry air from the cold-air dried air which has passed through the evaporator and a desorbing part configured to supply recycled air heated by the condensation heat of the condenser as a recycling heat source, and a control unit configured to simultaneously control a cold-air drying operation and a desiccant drying operation according to the humidity and temperature of the drying chamber, wherein the cold-air drying operation and the desiccant drying operation are selectively performed according to a condition so that wet air in the drying chamber is sent into the drying chamber as dry air, and the dry air and the ventilating air within the drying chamber are circulated so that the temperature and humidity in the drying chamber may be maintained at target values.

Advantageous Effects

According to the hybrid drying system and the method of controlling the hybrid drying system according to the present invention, a cold-air drying operation and a desiccant drying operation are combined and only condensation heat of a condenser is used as a recycling heat source of a desiccant drier so that the cold-air drying operation and the desiccant drying operation are simultaneously performed even at a dew point of below 5 degrees Celsius where the cold-air drying operation is difficult to be performed while improving the amount of dried moisture, making it possible to perform the drying operations even at a dew point of –10 degrees Celsius and thus reduce drying time and energy by more than 50 percent. Further, since products are dried at a normal temperature, the product values of the dried articles are enhanced as they are dried in a natural drying state unlike in a hot-air drying method.

Furthermore, according to the hybrid drying system and the method of controlling the hybrid drying system according to the present invention, since articles can be dried at more than 2 kg/h per 1 kw (860 kcal/h) on average, more than twice drying efficiency can be achieved, considering that the conventional hot-air drying method consumes 600 kcal/kg per 1 kg of dried moisture, thereby making it possible to maintain the quality, taste, and odor of the dried articles.

BEST MODE

Mode for Invention

Figure 1:
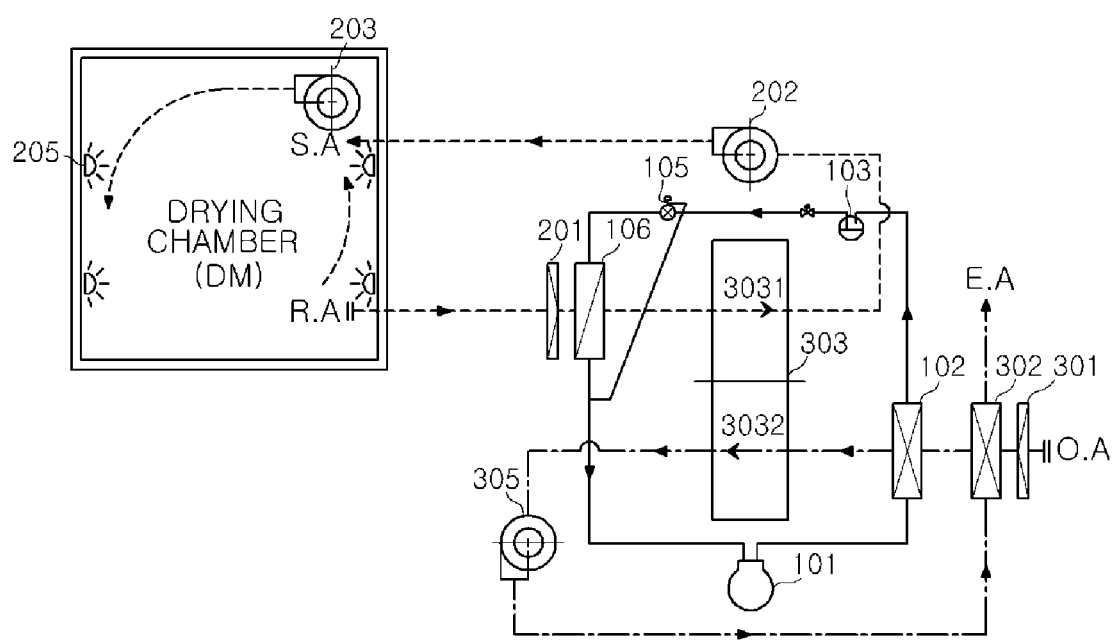
FIG. 1 is a view illustrating a hybrid drying system according to the first embodiment of the present invention.

First, the fields to which the present invention can be applied will be described.

The items that can be dried by a hybrid drying system according to the present invention include agricultural products such as chili peppers, radishes, tobaccos, and seed plants, marine products such as cuttlefishes, pollacks, sea tangles, sea mustards, sea cucumbers, seafood, and processed food, medicines such as tablets and mosquito coils, foods such as powder seasoning, instant food, sugar food, bakery, electronic parts, leather, fibers, wood, sludge, and national defense (storage and manufacturing of ammunitions), in addition to high-temperature drying fields such as hot-air drying fields.

Hereinafter, exemplary embodiments of the present invention will be described with reference to accompanying drawings.

In the drawings, the solid lines indicate a refrigerant cycle, the dotted lines, a drying cycle and a drying chamber circulation cycle, and the dashed dot lines, a recycling cycle.

Figure 2:
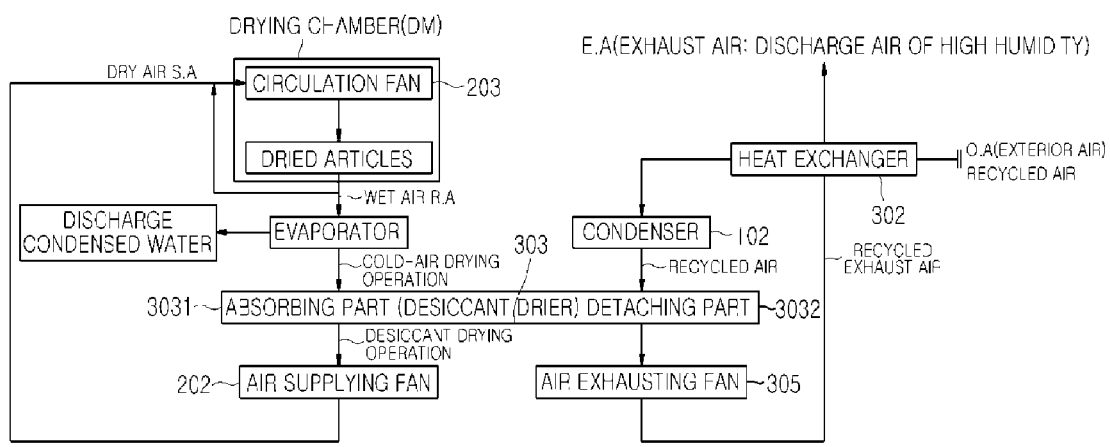
FIG. 2 is a control flowchart of the first embodiment of the present invention illustrated in FIG. 1.

FIG. 1 is a view illustrating a hybrid drying system according to the first embodiment of the present invention. FIG. 2 is a control flowchart of the first embodiment of the present invention illustrated in FIG. 1.

As illustrated in FIG. 1, the hybrid drying system according to the present invention includes a drying chamber DM where dried articles are positioned, a compressor 101 configured to compress a refrigerant transferred thereto from an evaporator, a condenser 102 configured to receive the refrigerant compressed by the compressor and condense the compressed refrigerant, a liquid receiver 103, an expansion valve 105 configured to expand the refrigerant which has passed the condenser 102, an evaporator configured to heat-exchange which has passed the expansion valve 105 with the air retrieved from the drying chamber DM to perform a cold-air drying operation, a circulation fan 203 configured to mix the drying chamber air RA and the blown drying air SA and circulate the mixed air to dry the dried articles within the drying chamber DM, and a sunlight illuminating lamp 205 provided in the drying chamber DM to expedite a drying operation and improve the physical and chemical characteristics of dried articles under a natural drying condition.

Also, the hybrid drying system according to the present invention includes an air filter 301, a heat exchanger 302 configured to heat-exchange exterior air with recycled exhaust air to retrieve exhausted heat, a desiccant dryer 303 having an absorbing part 3031 configured to produce dry air from the cold-air dried air which has passed through the evaporator 106 and a desorbing part 3032 configured to supply the recycled air heated by the condensation heat of the condenser as a recycling heat source, an exhaust fan configured to blow the recycled air which has passed through the desiccant drier 303 toward the exhaust side, and a control unit (not shown) configured to simultaneously control a cold-air drying operation and a desiccant drying operation according to the humidity and temperature of the drying chamber DM.

The hybrid drying system according to the present invention is defined to have four cycles including a freezing cycle, a drying cycle, a drying chamber circulating chamber, and a recycling cycle.

The paths of the four cycles will be described with reference to FIGS. 1 and 2.

The path of the freezing cycle includes a compressor 101 configured to compress a refrigerant gas transferred thereto from an evaporator 106, a condenser 102 configured to receive a refrigerant compressed in the compressor 101 and heat-exchange the refrigerant gas of a high temperature and a high pressure with recycled air to produce a high pressure refrigerant liquid from the refrigerant gas of a high temperature and a high pressure, an expansion valve 105 configured to produce a low pressure refrigerant liquid from the high pressure refrigerant liquid which has passed the condenser 102, and an evaporator 106 configured to heat-exchange the low pressure refrigerant liquid which has passed through the expansion valve 105 with the drying chamber air RA suctioned from the drying chamber DM to perform a cold-air drying operation.

The path of the drying cycle includes an evaporator 106 configured to heat-exchange the refrigerant liquid which has passed through the expansion valve 105 with the drying chamber air (RA) suctioned from the drying chamber DM to perform a cold-air drying operation, an absorbing part 3031 configured to produce dry air from the cold-air dried air which has passed through the evaporator 106 in the desiccant drier 303, an air supply fan 202 configured to blow the dry air produced in the desiccant drier 303 into the drying chamber DM, and an air supply line SA configured to supply the dry air blown by the air supply fan 202 into the drying chamber DM.

The path of the recycling cycle includes a heat exchanger 302 configured to introduce the exterior air OA as a recycled air via an air filter 301 and heat-exchange the recycled air with the recycled exhaust air to retrieve recycled exhaust heat, a condenser 102 configured to heat-exchange the recycled air which has passed through the heat exchanger 302 with the condensation heat of the condenser to heat the recycled air, a desorbing part 3032 configured to recycle the desiccant drier 303 using the recycled air heated by the condensation heat of the condenser, a recycling fan 305 configured to blow the recycled air which has passed through the desiccant drier 303 toward the exhaust side, a heat exchanger 302 configured to heat-exchange the recycled exhaust air blown by the recycling fan 305 to retrieve heat into the recycled air, and an outlet configured to discharge the exhaust air EA which has passed through the heat exchanger with the recycled exhaust air.

In the drying chamber circulating cycle, a circulation fan 203 is operated to mix the drying chamber air RA and the blown dry air SA and circulate the mixed air to dry the dried articles within the drying chamber DM, a cold-air drying operation and a desiccant drying operation are controlled to be performed by a control unit (not shown) according to the temperature and humidity of the drying chamber DM.

Figure 3:
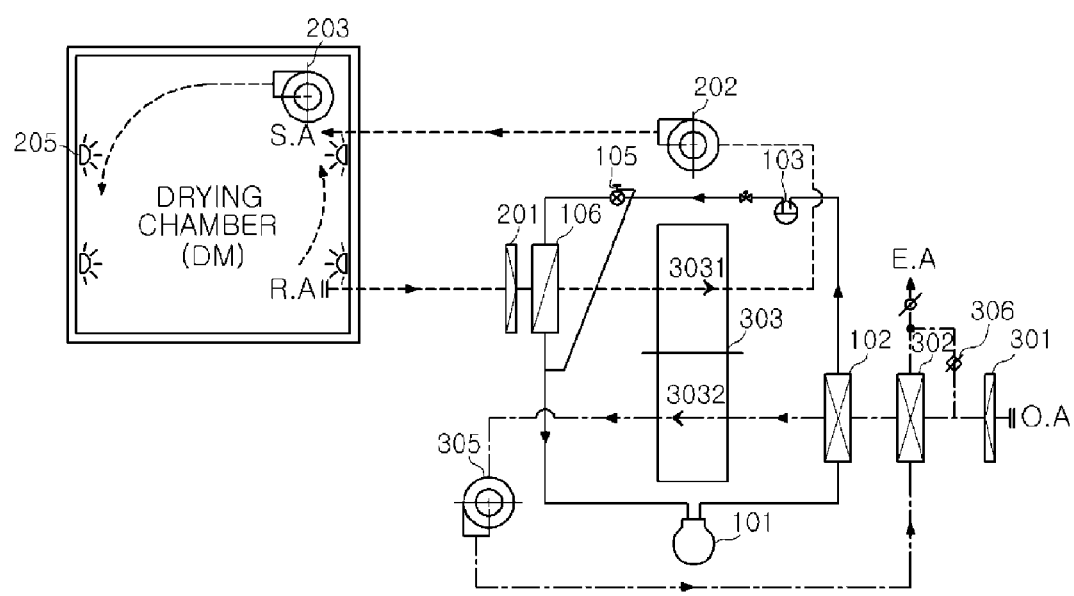
FIG. 3 is a view illustrating a hybrid drying system according to the second embodiment of the present invention.
Figure 4:
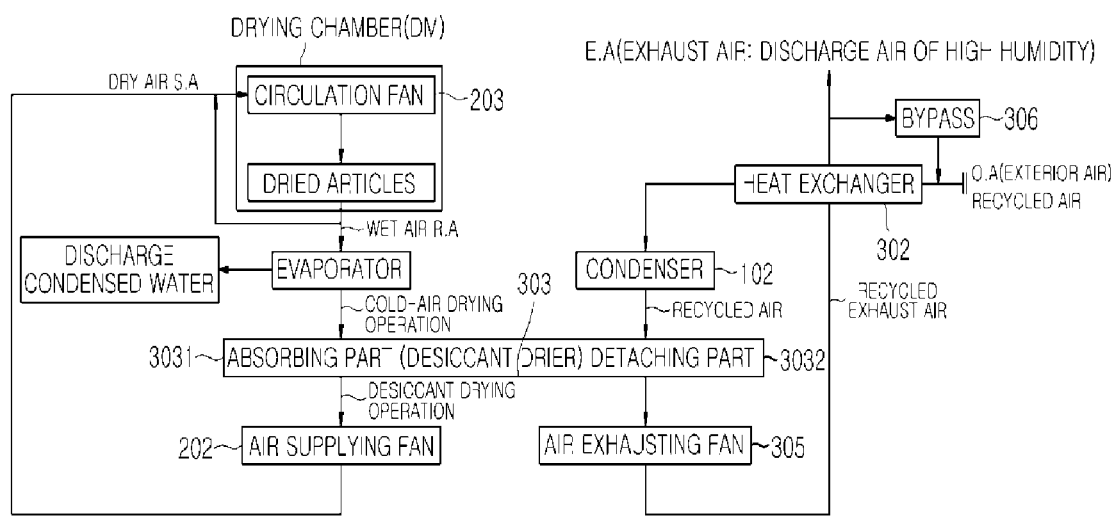
FIG. 4 is a control flowchart of the second embodiment of the present invention illustrated in FIG. 3.

FIG. 3 is a view illustrating a hybrid drying system according to the second embodiment of the present invention, wherein a bypass damper is provided to the regenerating exhaust side so that the temperature of an exterior air inlet can rise above zero ° C. during winter season when the temperature of exterior air is below zero ° C. FIG. 4 is a control flowchart of the hybrid drying system according to the second embodiment of the present invention illustrated in FIG. 3. In the following description, the same parts as in FIGS. 1 and 2 will not be repeated.

The hybrid drying method according to the second embodiment of the present invention is carried out as illustrated in FIGS. 1 and 2, but some of the recycled exhaust gas EA is bypassed by a bypass damper 306 to make an exterior inlet temperature of the recycled air above zero with a thermostat during a winter season when the temperature of exterior air is low.

A sunlight illuminating lamp 205 or a far-infrared radiation emitter is added to the drying chamber DM to naturally dry dried articles and improve their physical and chemical characteristics.

Figure 5:
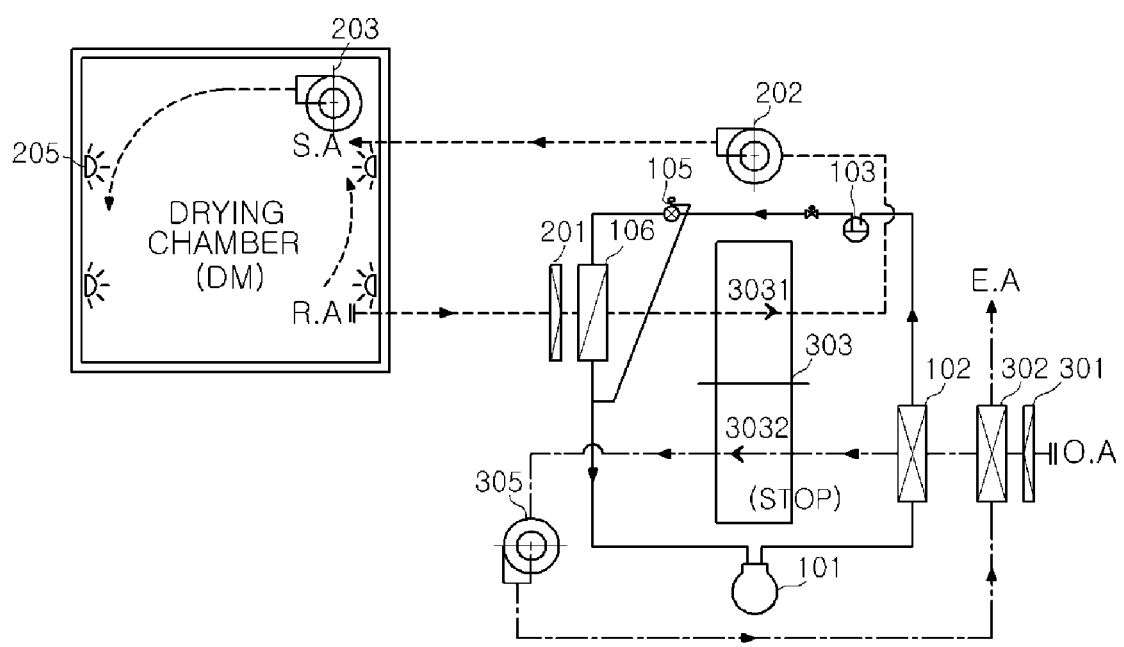
FIG. 5 is a view illustrating a hybrid drying system according to the third embodiment of the present invention.
Figure 6:
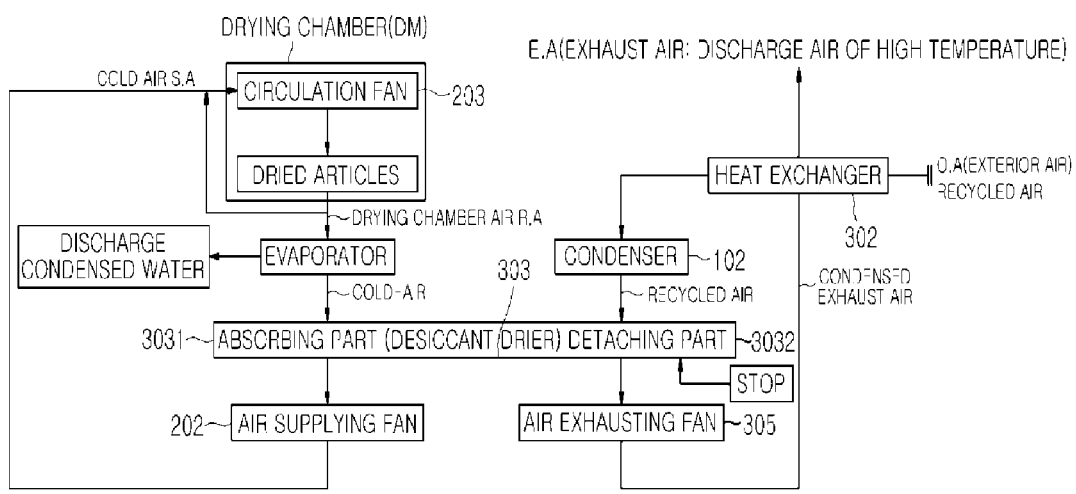
FIG. 6 is a control flowchart of the third embodiment of the present invention illustrated in FIG. 5.

FIG. 5 is a view illustrating a hybrid drying system according to the third embodiment of the present invention, wherein the interior of the drying chamber DM is used as a refrigerating compartment. FIG. 6 is a control flowchart of the third embodiment of the present invention illustrated in FIG. 5. In the following description, the same parts as in FIGS. 1 and 2 will not be repeated.

When the interior of the drying chamber DM is used as a refrigerating compartment, the freezing cycle and the recycling cycle of the four cycles in the hybrid drying system are performed and the drying cycle is stopped. In this case, the drying chamber circulating cycle may be controlled through an air amount regulating operation.

To achieve this, the path of the freezing cycle includes a compressor 101 configured to compress a refrigerant gas transferred thereto from an evaporator 106 exchanging heat with the drying chamber air RA, a condenser 102 configured to receive the refrigerant compressed in the compressor 101 and heat-exchange the refrigerant gas of a high temperature and a high pressure with recycled air to produce a high pressure refrigerant liquid from the high pressure refrigerant gas, an expansion valve 105 configured to produce a low pressure refrigerant liquid from the high pressure refrigerant liquid which has passed the condenser 102, and an evaporator 106 configured to heat-exchange the low pressure refrigerant liquid which has passed through the expansion valve 105 with the drying chamber air suctioned from the drying chamber DM to produce cold air.

Since the desiccant drier is stopped in the drying cycle, the evaporator 106 heat-exchanges the refrigerant liquid which has passed the expansion valve 105 with the ventilating air RA suctioned from the drying chamber DM and the cold air which has passed through the evaporator 106 passes through the stopped desiccant drier 303 without exchanging heat. The air supply fan 202 blows the cold air which has passed through the stopped desiccant drier 303 into the drying chamber DM and the cold air blown by the air supply fan 202 is supplied into the drying chamber DM through an air supply line SA.

The condensation heat is discharged in the recycling cycle, and the path of the recycling cycle includes a heat exchanger 302 configured to introduce the exterior air OA as a recycled air via an air filter 301 and heat-exchange the recycled air with the recycled exhaust air to retrieve recycled exhaust heat, a condenser 102 configured to heat-exchange the recycled air which has passed through the heat exchanger 302 with the condensation heat of the condenser to heat the recycled air, a desorbing part 3032 which does not recycle the stopped desiccant drier 303 using the recycled air heated by the condensation heat of the condenser, a recycling fan 305 configured to blow the recycled air which has passed through the desiccant drier 303 without exchanging heat toward the exhaust side, a heat exchanger 302 configured to heat-exchange the recycled exhaust air blown by the recycling fan 305 to retrieve heat to the recycled air, and an outlet configured to discharge the exhaust air EA which has passed through the heat exchanger with the recycled exhaust air.

Since it is advantageous to regulate the amount of blown air in the drying chamber circulating cycle, the ventilated air in the drying chamber DM and the supplied dry air are mixed and the circulation fan 203 configured to circulate to dry the dried articles in the drying chamber DM is operated.

The control unit (not shown) can control cold air according to the temperature of the drying chamber DM to accomplish a refrigerating operation of the hybrid drying system.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A hybrid drying system applied to a box-type system, a rotary system, and an automatic feeding system for drying articles to be dried at room temperature, the hybrid drying system comprising:
   a drying chamber to house the articles to be dried;
   a compressor to compress a refrigerant to be drawn from an evaporator;
   a condenser to receive and condense the refrigerant compressed by the compressor;
   an expansion valve to expand the refrigerant which has passed through the condenser;
   the evaporator to heat-change the refrigerant which has passed through the expansion valve and drying chamber air to cold air to perform a cold-air drying operation;
   a desiccant drier positioned between the condenser and the evaporator, the desiccant drier having an absorbing part to change the cold air which has passed through the evaporator to dry air and a desorbing part to supply recycled air heated by condensation heat of the condenser as a recycling heat source;

a heat exchanger to heat-exchange exterior air and recycled exhaust air by using the recycled air, to retrieve exhaust heat; and a control unit to simultaneously control the cold-air drying operation and a desiccant drying operation according to the humidity and temperature of the drying chamber, wherein the hybrid drying system is operated through a freezing cycle, a drying cycle, a drying chamber circulating cycle, and a regenerating cycle, wherein the freezing cycle includes the compressor to compress a refrigerant gas drawn to the evaporator, the condenser to receive the refrigerant gas compressed by the compressor and heat-exchange the refrigerant gas of a high temperature and a high pressure with the recycled air to produce a high pressure refrigerant liquid from a high pressure refrigerant gas, the expansion valve to produce a low pressure refrigerant liquid from the high pressure refrigerant liquid which has passed through the condenser, and the evaporator to heat-exchange the low pressure refrigerant liquid which has passed through the expansion valve with the drying chamber air drawn from the drying chamber to perform the cold-air drying operation, wherein the drying cycle includes the evaporator to heat-exchange the refrigerant liquid which has passed through the expansion valve with the drying chamber air drawn from the drying chamber to perform the cold-air drying operation, the absorbing part of the desiccant dryer to change the cold air which has passed through the evaporator to the dry air in the desiccant drier, an air supply fan to blow the dry air produced in the desiccant drier into the drying chamber, and an air supply line to supply the dry air blown by the air supply fan into the drying chamber, wherein the regenerating cycle includes the heat exchanger to introduce the exterior air as the recycled air via an air filter and heat-exchange the recycled air with the recycled exhaust air to retrieve recycled exhaust heat, the condenser to heat-exchange the recycled air which has passed through the heat exchanger with the condensation heat of the condenser to heat the recycled air, the desorbing part of the desiccant dryer to regenerate the desiccant drier by using the recycled air heated by the condensation heat of the condenser, a regenerating fan to blow the recycled air which has passed through the desiccant drier toward an exhaust side, the heat exchanger to heat-exchange the recycled exhaust air blown by the regenerating fan to retrieve heat into the recycled air, and an outlet to discharge the exhaust air which has passed through the heat exchanger with the recycled exhaust air, and wherein, when an interior of the drying chamber is used as a refrigerating compartment, the freezing cycle and the regenerating cycle of the four cycles in the hybrid drying system are performed and the drying cycle is stopped, and the drying chamber circulating cycle is controlled through an air amount regulating operation.

\* \* \* \* \*